US 8,176,808 B2

(12) United States Patent
Fisk et al.

(10) Patent No.: US 8,176,808 B2
(45) Date of Patent: May 15, 2012

(54) ROBOT ARM ASSEMBLY

(75) Inventors: Allan T. Fisk, Needham, MA (US);
Jonathan Hastie, Halifax, MA (US);
Hans Hug, Weston, MA (US); Lance Andrus, Southborough, MA (US);
Michael Johnson, Southborough, MA (US); David Hoadley, Lexington, MA (US)

(73) Assignee: Foster-Miller, Inc., Waltham, MA (US)

( * ) Notice: Subject to any disclaimer, the term of this patent is extended or adjusted under 35 U.S.C. 154(b) by 520 days.

(21) Appl. No.: 11/901,200

(22) Filed: Sep. 13, 2007

(65) Prior Publication Data
US 2009/0071281 A1    Mar. 19, 2009

(51) Int. Cl.
*B25J 17/00* (2006.01)
*B25J 17/02* (2006.01)
*B25J 18/00* (2006.01)

(52) U.S. Cl. .................... 74/490.05; 74/490.03

(58) Field of Classification Search .......... 74/490.01, 74/490.03, 490.05; 901/25, 27
See application file for complete search history.

(56) References Cited

U.S. PATENT DOCUMENTS

| | | | |
|---|---|---|---|
| 429,903 A | 6/1890 | Jannaccone | |
| 816,236 A | 3/1906 | Kline | |
| 832,541 A | 10/1906 | Dodge | |
| 1,350,124 A | 8/1920 | Venable | |
| 1,479,310 A | 1/1924 | Monroe | |
| 2,132,795 A | 10/1938 | Minier | |
| 2,221,192 A | 11/1940 | Juhl | |
| 2,594,763 A | 4/1952 | Freyer | |
| 2,613,100 A | 10/1952 | Casey, Jr. | |
| 2,617,203 A | 11/1952 | Murray | |
| 2,617,211 A | 11/1952 | Olson | |
| 2,665,434 A | 1/1954 | Saunders | |
| 2,710,765 A | 6/1955 | Anthony Arens | |
| 2,891,813 A | 6/1959 | Toyojiro | |
| 2,926,865 A | 3/1960 | Humphreys | |
| 3,042,440 A | 7/1962 | Weil, Sr. et al. | |
| 3,108,498 A * | 10/1963 | Hedin et al. | 475/5 |
| 3,202,449 A | 8/1965 | Lemelson | |
| 3,247,979 A * | 4/1966 | Melton et al. | 414/735 |
| 3,370,213 A | 2/1968 | Richard | |
| RE26,904 E | 5/1970 | Lemelson | |
| 3,558,177 A | 1/1971 | Snead | |
| 3,645,578 A | 2/1972 | Renfroe | |
| 3,765,347 A | 10/1973 | Tormstrom | |
| 3,866,966 A | 2/1975 | Skinner, II | |
| 3,914,884 A | 10/1975 | Guinot | |
| 3,920,137 A | 11/1975 | McCain | |

(Continued)

FOREIGN PATENT DOCUMENTS

EP           24751 A1     3/1981

(Continued)

*Primary Examiner* — Justin Krause
(74) *Attorney, Agent, or Firm* — Iandiorio Teska & Coleman, LLP

(57) ABSTRACT

A robot arm assembly a base unit with a shoulder assembly rotatably disposed on the base unit. A lower robot arm is pivotably attached to the shoulder assembly. An upper robot arm is pivotably attached to the lower robot arm. The base unit includes a first motor which rotates a main shaft fixed to the shoulder assembly to rotate the shoulder. A second motor in the base unit rotates a second shaft in the shoulder assembly extending through the main shaft to pivot the lower robot arm with respect to the shoulder.

24 Claims, 9 Drawing Sheets

U.S. PATENT DOCUMENTS

| | | | |
|---|---|---|---|
| 3,952,880 A | 4/1976 | Hill et al. |
| 4,000,784 A | 1/1977 | Morrow, Sr. et al. |
| 4,062,455 A | 12/1977 | Flatau |
| 4,097,084 A | 6/1978 | Russell |
| 4,114,464 A | 9/1978 | Schubert et al. |
| 4,281,866 A | 8/1981 | Atcheson |
| 4,367,893 A | 1/1983 | Berg |
| 4,370,091 A | 1/1983 | Gagliardi |
| 4,456,293 A | 6/1984 | Panissidi |
| 4,478,451 A | 10/1984 | Brucher et al. |
| 4,489,969 A | 12/1984 | Merry |
| 4,494,441 A | 1/1985 | Magnuson |
| 4,501,522 A * | 2/1985 | Causer et al. ............ 414/4 |
| 4,512,524 A | 4/1985 | Shigemizu |
| 4,600,355 A | 7/1986 | Johnson |
| 4,600,357 A | 7/1986 | Coules |
| 4,621,562 A | 11/1986 | Carr et al. |
| D287,218 S | 12/1986 | Portz |
| 4,645,409 A | 2/1987 | Gorman |
| 4,648,464 A | 3/1987 | Huxley |
| 4,678,220 A | 7/1987 | Gabriel |
| 4,697,838 A | 10/1987 | Hartman |
| 4,699,414 A | 10/1987 | Jones |
| 4,709,265 A | 11/1987 | Silverman et al. |
| 4,738,576 A * | 4/1988 | Eberle et al. ............ 414/4 |
| 4,766,775 A * | 8/1988 | Hodge .............. 74/490.01 |
| 4,773,298 A | 9/1988 | Tischer et al. |
| 4,778,211 A | 10/1988 | Gabriel |
| 4,784,422 A | 11/1988 | Jones et al. |
| 4,810,019 A | 3/1989 | Brucher |
| 4,822,233 A | 4/1989 | Hansel |
| 4,822,238 A | 4/1989 | Kwech |
| 4,865,400 A | 9/1989 | Caron et al. |
| 4,932,831 A | 6/1990 | White et al. |
| 4,941,416 A | 7/1990 | Faulring |
| 4,993,914 A | 2/1991 | Riddle |
| 5,024,397 A | 6/1991 | Edwards et al. |
| 5,033,785 A | 7/1991 | Woolley, Jr. |
| 5,060,378 A | 10/1991 | LaBounty et al. |
| 5,063,628 A | 11/1991 | Campbell |
| 5,081,941 A | 1/1992 | Weeks |
| 5,098,024 A | 3/1992 | MacIntyre et al. |
| 5,195,388 A | 3/1993 | Zona et al. |
| 5,222,409 A | 6/1993 | Dalakian |
| 5,360,071 A | 11/1994 | Bergendorf |
| 5,385,311 A | 1/1995 | Morikawa et al. |
| 5,427,424 A | 6/1995 | Robinson |
| 5,435,405 A | 7/1995 | Schempf et al. |
| 5,440,916 A | 8/1995 | Stone et al. |
| 5,443,354 A | 8/1995 | Stone et al. |
| 5,474,242 A | 12/1995 | Rafn |
| 5,485,691 A | 1/1996 | Stevens et al. |
| 5,570,992 A | 11/1996 | Lemelson |
| 5,600,904 A | 2/1997 | Bowling |
| 5,672,044 A | 9/1997 | Lemelson |
| 5,769,341 A | 6/1998 | Morikawa et al. |
| 5,842,427 A | 12/1998 | Hunter et al. |
| 5,872,892 A | 2/1999 | Brown et al. |
| 5,921,302 A | 7/1999 | Petersen |
| 6,113,343 A | 9/2000 | Goldenberg et al. |
| 6,217,094 B1 | 4/2001 | Hanaduka et al. |
| 6,236,906 B1 | 5/2001 | Muller |
| 6,283,220 B1 | 9/2001 | Carter |
| 6,338,512 B1 | 1/2002 | Ruppert et al. |
| 6,341,568 B1 | 1/2002 | Culley |
| 6,341,933 B1 | 1/2002 | Gagnon et al. |
| 6,377,872 B1 | 4/2002 | Struckman |
| 6,431,296 B1 | 8/2002 | Won |
| 6,491,127 B1 | 12/2002 | Holmberg et al. |
| 6,508,496 B1 | 1/2003 | Huang |
| 6,523,284 B1 | 2/2003 | Clugston |
| 6,526,678 B2 | 3/2003 | Waddington, Jr. |
| 6,615,753 B1 | 9/2003 | Culley |
| 6,702,050 B1 | 3/2004 | Mazhar |
| 6,722,296 B2 | 4/2004 | Reilly |
| 6,766,973 B2 | 7/2004 | Muri |
| 6,842,674 B2 | 1/2005 | Solomon |
| 6,904,976 B1 | 6/2005 | Zach et al. |
| 6,999,849 B2 | 2/2006 | Bridges |
| 7,104,576 B1 | 9/2006 | Dorr |
| 2004/0006824 A1 | 1/2004 | Huang |
| 2004/0030448 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0068416 A1 | 4/2004 | Solomon |
| 2004/0134336 A1 | 7/2004 | Solomon |
| 2005/0204850 A1 | 9/2005 | Nihei et al. |
| 2006/0156852 A1 * | 7/2006 | Haniya ............ 74/490.03 |
| 2006/0192515 A1 * | 8/2006 | Takayama et al. ....... 318/568.21 |
| 2006/0283054 A1 | 12/2006 | Crow |
| 2006/0289178 A1 | 12/2006 | Basek |
| 2007/0097382 A1 | 5/2007 | Granger |
| 2007/0107917 A1 | 5/2007 | Doherty et al. |
| 2008/0073922 A1 | 3/2008 | Holtz |
| 2008/0083344 A1 | 4/2008 | Deguire et al. |
| 2008/0296920 A1 | 12/2008 | Kipping et al. |
| 2009/0071281 A1 | 3/2009 | Fisk et al. |
| 2009/0107917 A1 | 4/2009 | Capehart |
| 2009/0129003 A1 | 5/2009 | Bruck et al. |
| 2009/0164045 A1 | 6/2009 | Deguire et al. |
| 2010/0095799 A1 | 4/2010 | Albin et al. |
| 2010/0101356 A1 | 4/2010 | Albin et al. |
| 2010/0158656 A1 | 6/2010 | Seavey |
| 2010/0164243 A1 | 7/2010 | Albin et al. |

FOREIGN PATENT DOCUMENTS

| | | |
|---|---|---|
| WO | WO 2004/003680 | 1/2004 |
| WO | WO 2007/088206 A2 | 8/2007 |

* cited by examiner

ROBOT ARM ASSEMBLY

FIELD OF THE INVENTION

This subject invention relates to mobile, remotely controlled robots.

BACKGROUND OF THE INVENTION

Mobile, remotely controlled robots are becoming increasingly popular for use by the military, SWAT units, and police and fire departments. The applicants' TALON® robot, for example, includes an arm with an end effecter, several cameras, several antennas, and a deployable mast.

Presently, the lower robot arm has only one degree of freedom, i.e. it pitches up and down relative to the robot frame. The upper robot arm pivots with respect to the lower robot arm via a chain drive on the lower arm.

For certain missions, it would be desirable to turn the lower (hence the entire) robot arm. Robot arms with shoulders which allow the robot arm to turn (yaw) are known but, for robots like the TALON® robot, it can be difficult, due to size and weight constraints, to add a shoulder and the associated motors, transmissions for driving it.

Such robots are used in extremely harsh and hostile conditions and thus any component of the robot, including the robot arm assembly, must be fairly robust. Also, it may be undesirable, in some instances, to pivot the upper robot arm with respect to the lower robot arm via a chain drive.

There is also a need to be able to manually stow the arm quickly in order to place the robot in a vehicle. But, it is preferable that the arm remain in position even when its motors are not energized to save battery power.

SUMMARY OF THE INVENTION

It is therefore an object of this invention to provide a mobile, remotely controlled robot with a compact base unit including a shoulder which allows the robot arm to turn (to yaw).

It is a further object of this invention to provide such a compact base unit which can be retrofitted into existing robots.

It is a further object of this invention to provide such a base unit which provides increased torque for the robot arm both in pitch and in yaw.

It is a further object of this invention to provide a robot arm assembly which can be manually folded for transport.

The subject invention results from the realization, in part, that if a main shaft is driven to rotate the robot shoulder and if a second shaft extends through the main shaft and is driven to pitch the robot arm up and down, a compact base unit can be effected which can be retrofitted into existing robots.

The subject invention, however, in other embodiments, need not achieve all these objectives and the claims hereof should not be limited to structures or methods capable of achieving these objectives.

The subject invention, in one example, features a robot arm base unit. A shoulder assembly is rotatably disposed on the base unit and a lower robot arm pivotably attached to the shoulder assembly. An upper robot arm is pivotably attached to the lower robot arm. The preferred base unit includes a first motor which rotates a main shaft fixed to the shoulder assembly to rotate the shoulder. A second motor rotates a second shaft in the shoulder assembly extending through the main shaft to pivot the lower robot arm with respect to the shoulder.

In one example, the lower robot arm includes a third motor for pivoting the upper robot arm. Preferably, a brake is associated with each motor for locking the shoulder with respect to the base unit, for locking the lower robot arm with respect to the shoulder, and for locking the upper robot arm with respect to the lower robot arm automatically when the motors are de-energized. There is typically a brake release associated with each brake for manually rotating the shoulder assembly, pivoting the lower robot arm, and pivoting the upper robot arm.

In one example, the upper robot arm includes at least one telescoping section. The lower robot arm may be pivotably attached to the shoulder assembly via a yoke. There may be a gear reducer between the main shaft and the first motor. And, there may be a gear on the second shaft in the shoulder driven by a gear train. There is also typically a gear reducer between the second motor and the gear train.

In the preferred embodiment, the upper robot arm includes a rotatable wrist and a motor for driving the rotatable wrist.

One robot arm assembly in accordance with this invention includes a base unit, a shoulder assembly rotatably disposed on the base unit, and a lower robot arm pivotably attached to the shoulder assembly. The preferred base unit includes a first motor which rotates a main shaft fixed to the shoulder assembly to rotate the shoulder and a second shaft in the shoulder assembly to pivot the lower robot arm with respect to the shoulder.

The typical robot arm assembly may further include an upper robot arm pivotably attached to the lower robot arm. Then, the lower robot arm includes a third motor for pivoting the upper robot arm.

In one example, a robot arm assembly comprises a base unit, a shoulder assembly rotatably disposed on the base unit, a lower robot arm pivotably attached to the shoulder assembly, and an upper robot arm pivotably attached to the lower robot arm and driven by a motor in the lower robot arm. The upper robot arm includes a telescoping section and a motor driven rotatable wrist. The preferred base unit includes a first motor which rotates a main shaft fixed to the shoulder assembly to rotate the shoulder and a second shaft in the shoulder assembly extending through the main shaft to pivot the lower robot arm with respect to the shoulder. The preferred base unit also includes a gear fixed to the main shaft driven by the first motor through a gear reducer. The preferred shoulder includes a gear fixed to the second shaft driven by the second motor through a gear train and a gear reducer. A brake with a release is associated with the first motor and a brake with a release is also associated with the second motor.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
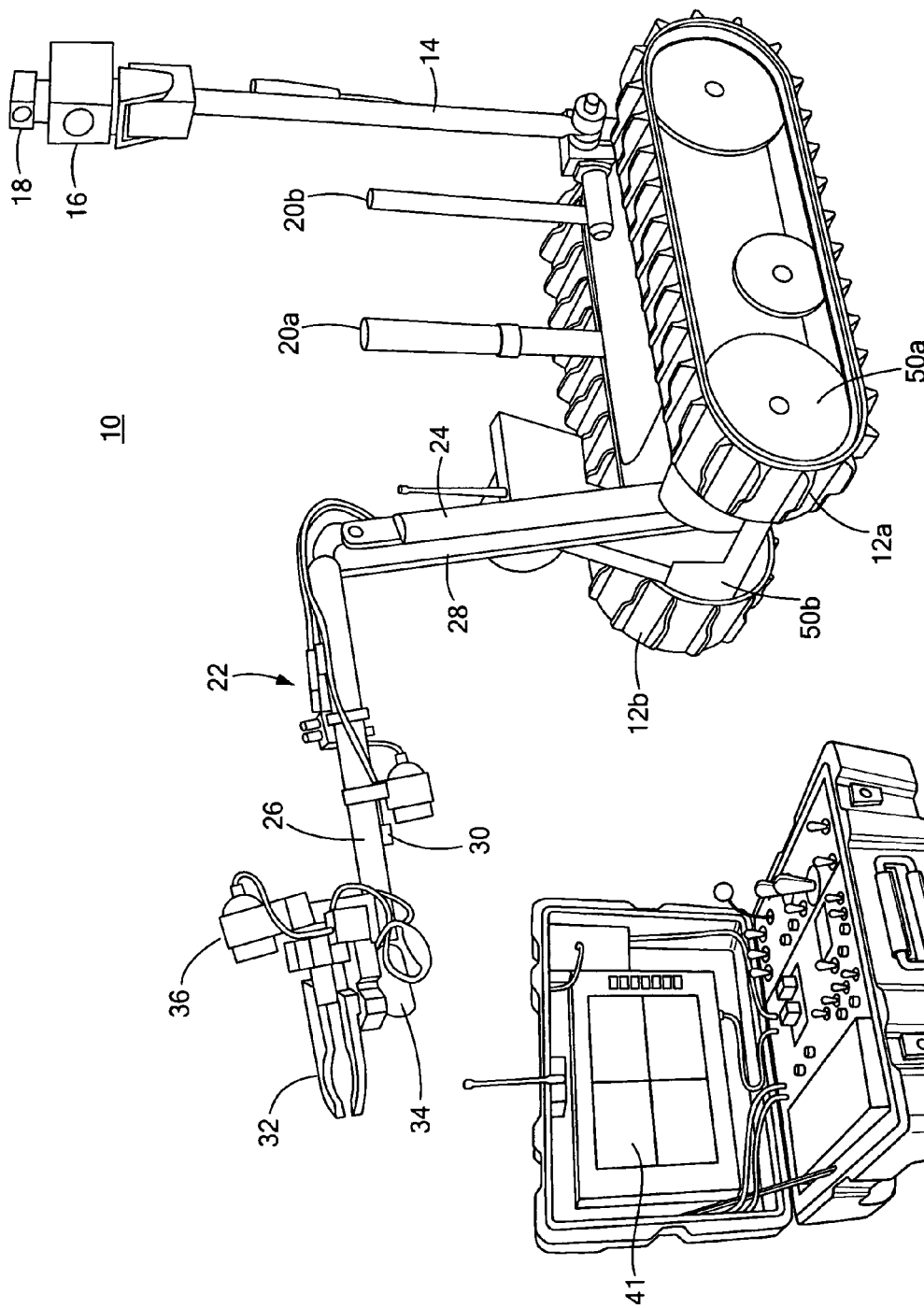
FIG. 1 is a schematic three-dimensional front view of an example of an existing robot including an upper and lower arm.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows robot 10 driven by tracks 12a and 12b in accordance with one particular example of a robot in accordance with the subject invention. Robot 10 includes deployable mast 14, camera 16, light 18, antennas 20a and 20b, and arm assembly 22. Arm assembly 22 includes lower arm 24 and upper arm 26. Lower arm 24 is able to pitch up and down but it does not turn. Upper arm 26 pitches with respect to lower arm 24 and is drive by chain drive 28 extending along lower arm 24. Microphone 30 is on upper arm as is gripper 32 which rotates via wrist 34. Camera 36 is typically aimed at gripper 32. Operator control unit 40 is used to wirelessly control robot 10 as is known in the art. The various images captured by the cameras of the robot may be displayed on view screen 41.

As discussed in the Background section above, it would be desirable for some missions to turn robot arm 22. Traditional robot arm shoulder assemblies, however, are not well-suited for integration into robot 10. There are often too bulky, weigh too much, and/or are not sufficiently robust. The present robot arm base unit (located between front track wheels 50a and 50b) which includes the motors and gears for pitching robot arms 24 and 26 is 15.4 inches long, 5.3 inches high, and 3.0 inches deep (thickness).

Figure 2:
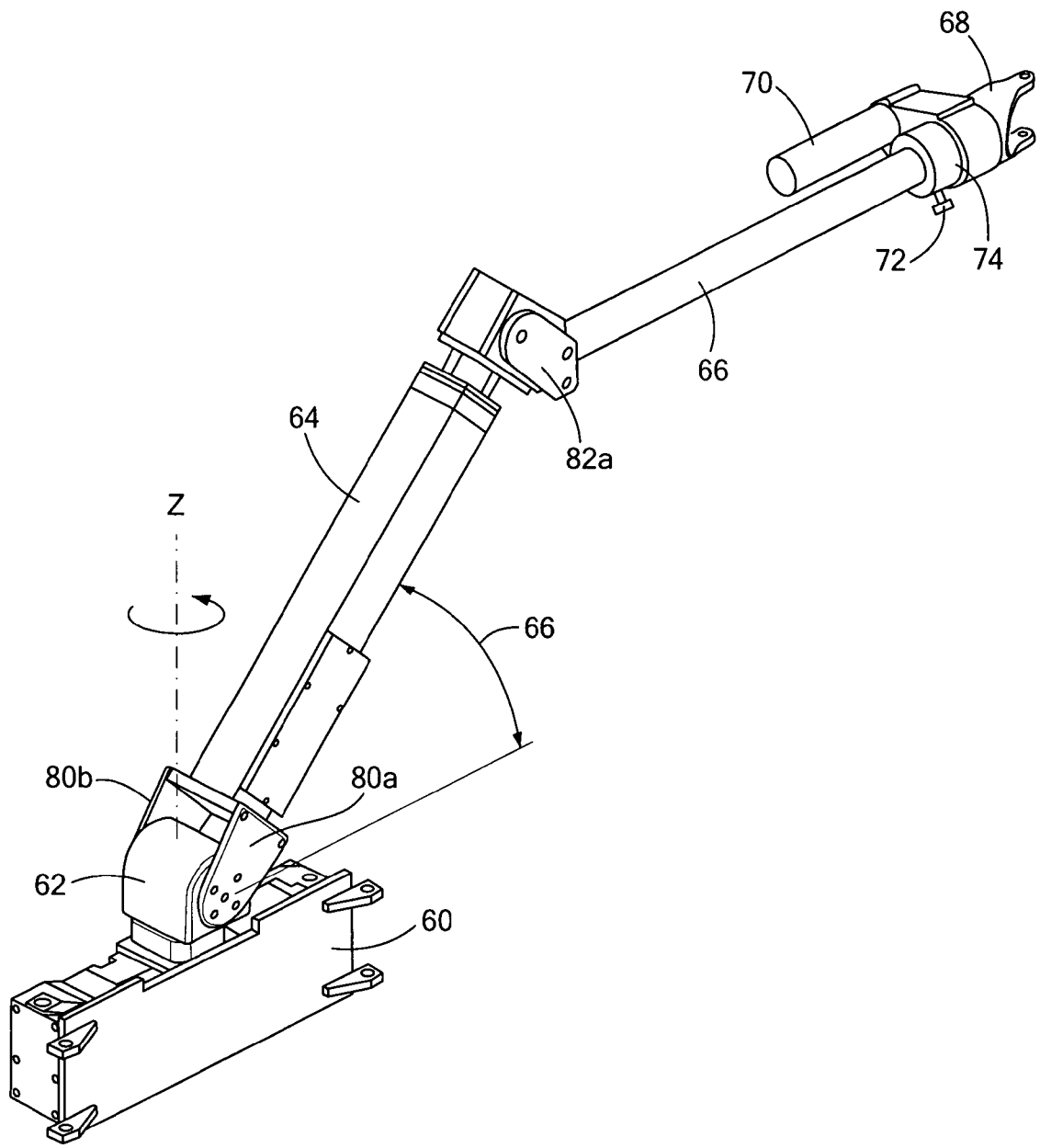
FIG. 2 is a schematic three-dimensional side view of am example of a robot arm assembly which can be retrofitted into the robot shown in FIG. 1.
Figure 3:
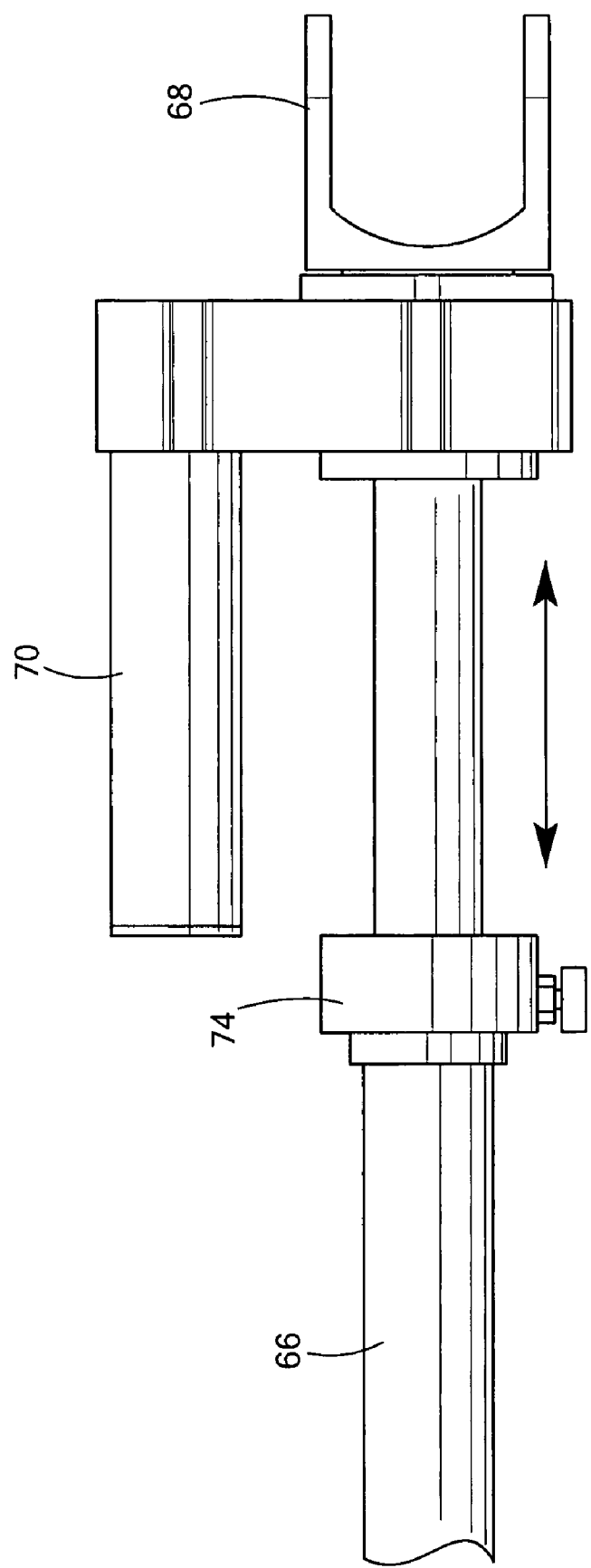
FIG. 3 is a highly schematic three-dimensional view showing how the upper robot arm includes a telescoping section.

In one preferred design, base unit 60, FIG. 2 is dimensioned the same as the prior base unit but includes shoulder assembly 62 rotatably disposed thereon to turn lower arm 64 about axis Z. Robot arm 64 also pitches up and down as shown by arrow 66. Upper robot arm 66 also pitches up and down relative to lower robot arm 64 and is driven by a motor/gear train combination inside lower arm 64. Upper arm 66 terminates in rotating wrist 68 driven by motor 70. And, by pulling pin 72 in collar 74, upper arm 66 telescopes outward as shown in FIG. 3.

Figure 4:
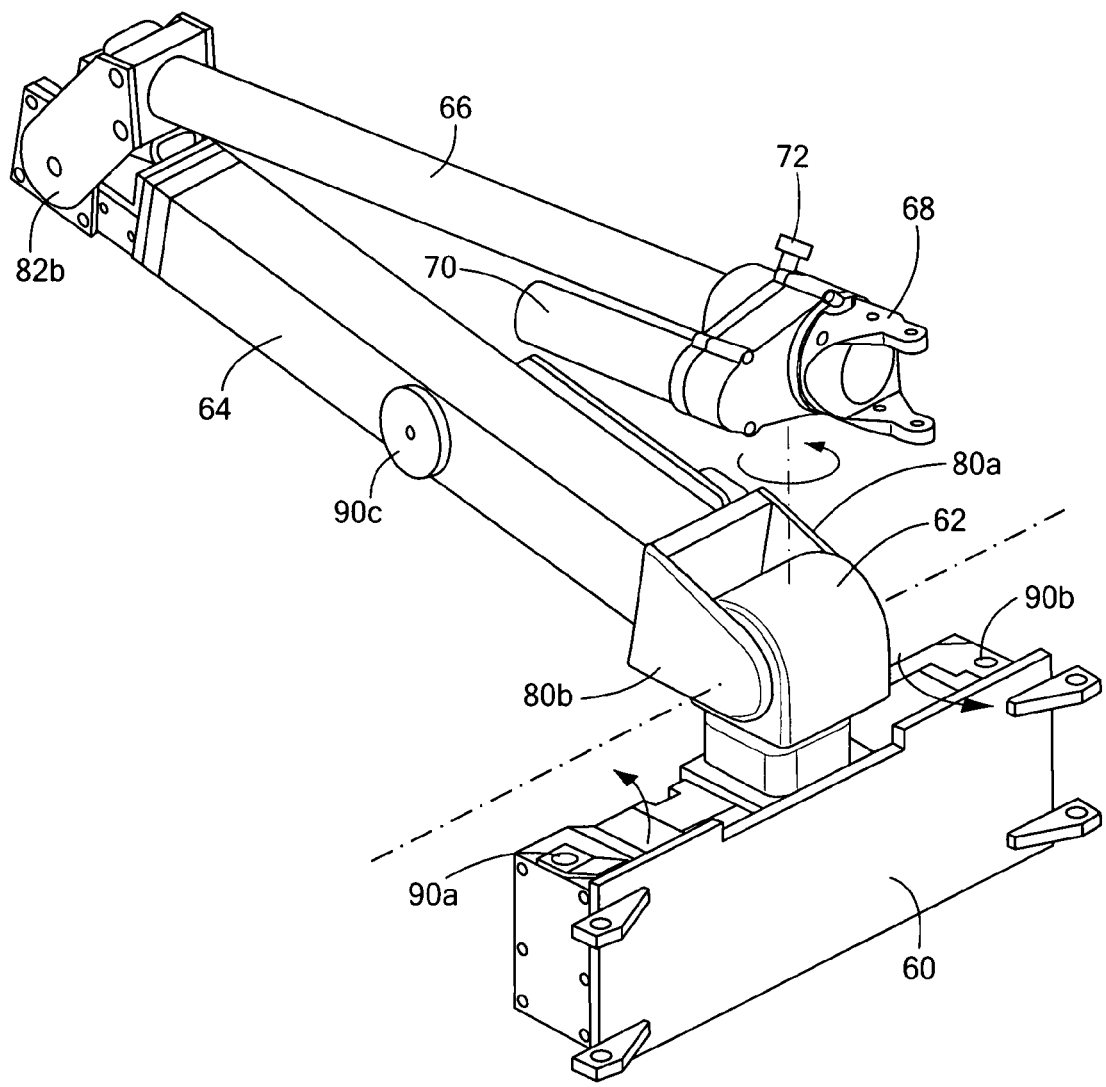
FIG. 4 is another schematic three-dimensional view of the robot arm assembly shown in FIG. 2.

Lower robot arm 64 is pivotably attached to shoulder 62 via yoke ears 80a and 80b. Upper robot arm 66 is pivotably attached to lower robot arm 64 via yoke ears 82a and 82b (see FIG. 4). In this way, a robot arm assembly with a rotatable shoulder can be retrofitted into robot 10, FIG. 1. FIG. 4 also shows brake releases 90a, 90b, and 90c. Brake release 90b allows shoulder 62 to be manually rotated. Brake release 90a allows arm 64 to be manually pitched up (or down), and brake release 90c allows robot arm 66 to be manually folded down (or up). In this way, when the various motors of the robot arms are deenergized, the robot arms are locked in place to save battery power but the brakes can be released to fold the arms for easier transport of the robot.

Figure 5:
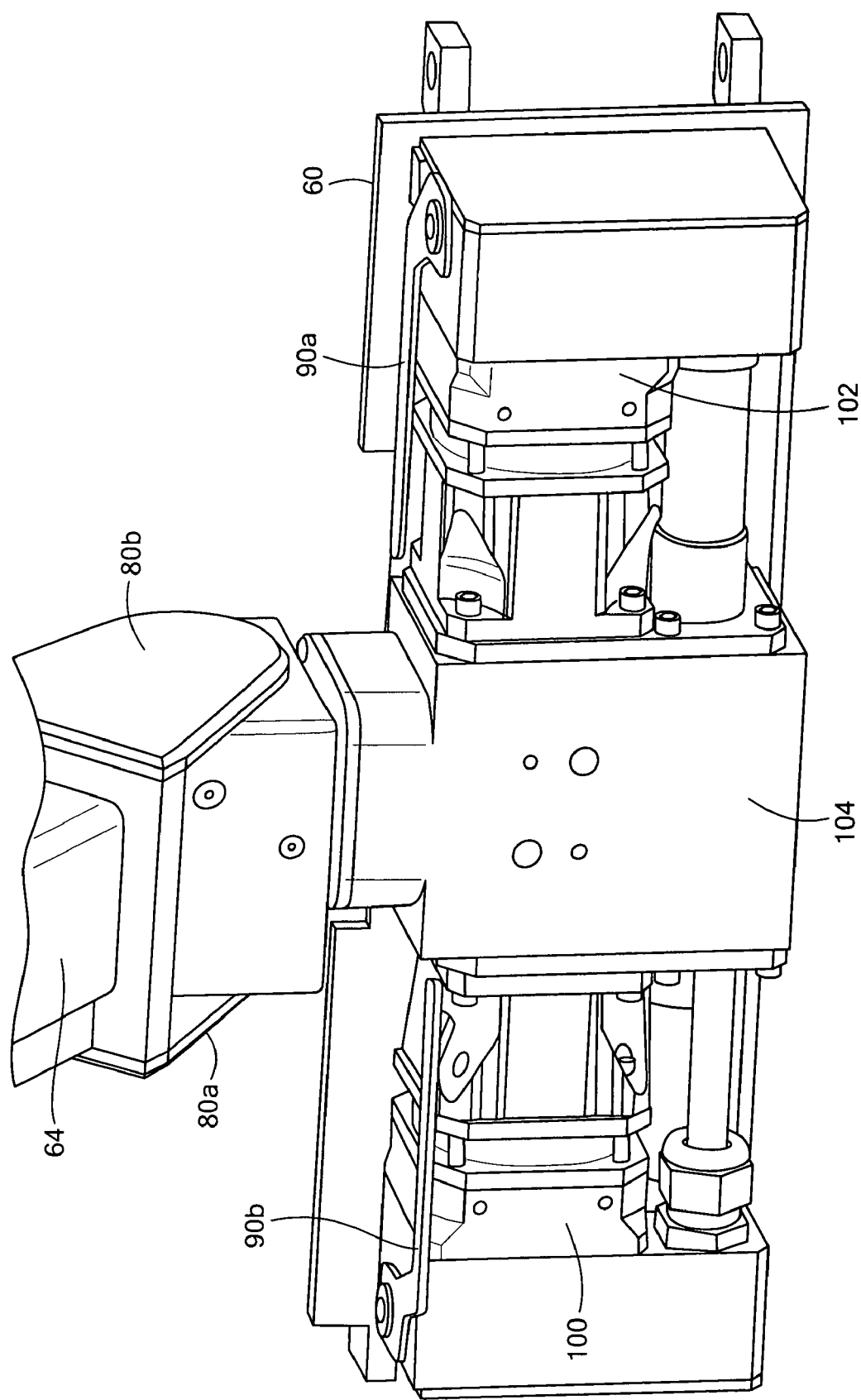
FIG. 5 is a schematic three-dimensional rearward view of the robot arm assembly base unit in accordance with one example of the subject invention.
Figure 6:
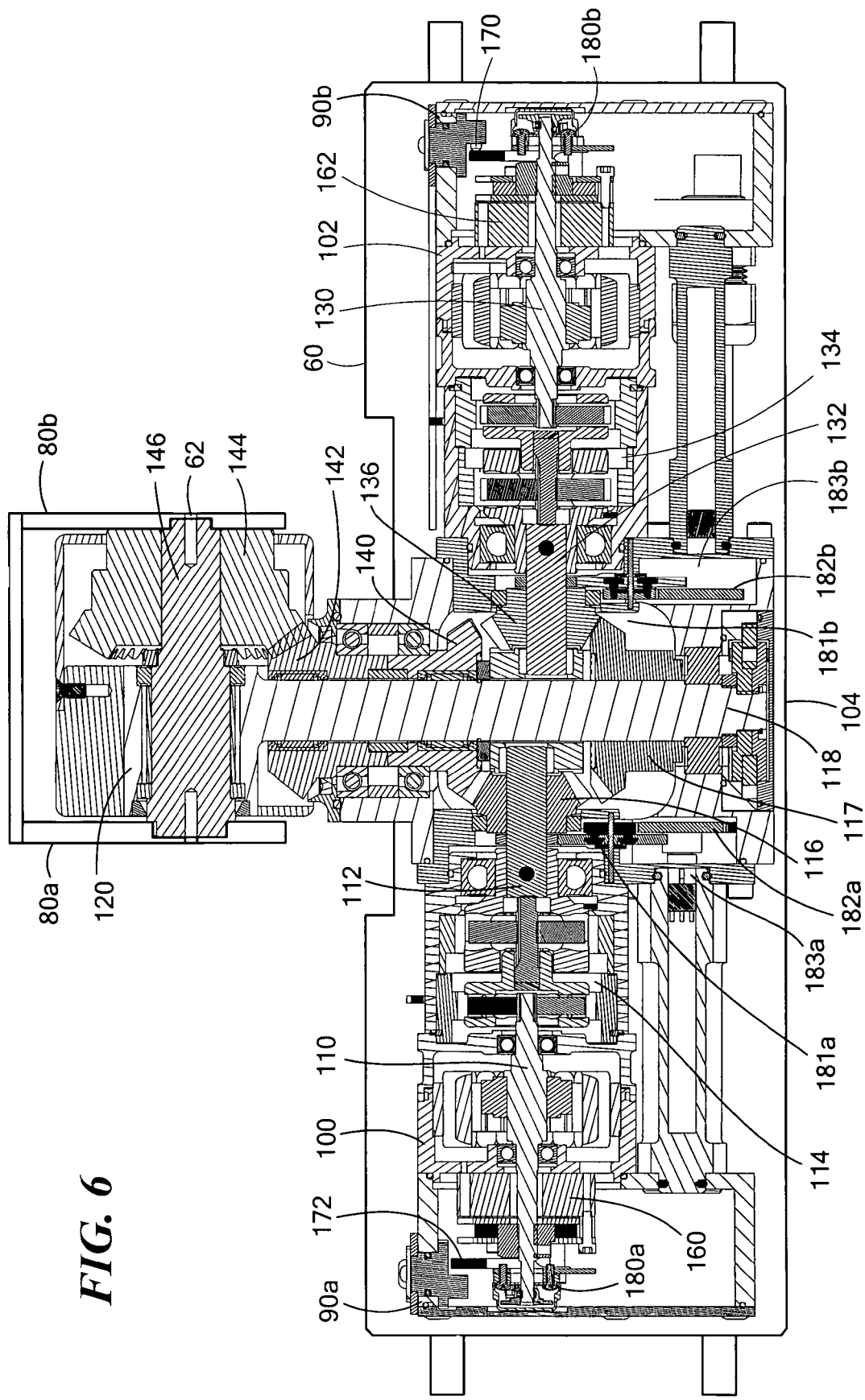
FIG. 6 is a schematic three-dimensional cut-away view showing the primary components associated with the base unit shown in FIG. 5.

FIG. 5 shows motor 100 which causes arm 64 to pitch up and down and motor 102 which causes shoulder 62 to rotate. One preferred transmission assembly 104 is shown more clearly in FIG. 6. Motor 100 turns shaft 110 connected to shaft 112 via two stage planetary gear reducer 114. Shaft 112 drives gear 116 which drives gears 140 and 142 which drives gear 144 on shaft 146 extending through and rotatable with respect to shaft 118 head 120. Shaft 146 is attached to yoke arm 80b and to yoke arm 80a via gear 144 and thus motor 100 rotates yoke arms 80a/b to pitch the lower robot arm up and down.

Motor 102 drives shaft 130 which in turn drives shaft 132 via two stage planetary gear reducer 134. Bevel gear 136 on shaft 132 drives gear 117 fixed to main shaft 118 which extends to head 120 fixed inside shoulder 62. Thus, energizing motor 102 rotates head 120 and thus shoulder 62.

When shaft 118 rotates, gear 144 walks around on gear 142 causing yoke arms 80a and 80b to pitch. So, if only rotation of shoulder 62 is desired, motor 102 is operated to run in the opposite direction of motor 100 to prevent pitching of the lower robot arm 64. The same is not true for pitching: if only pitching of the robot arm 64 is desired, motor 102 is held stationary while motor 102 is operated to pitch arm 64.

Brake 160 operates to automatically lock shaft 110 when motor 100 is deenergized. In this way, shaft 146 is locked in place and the lower robot arm does not pitch up or down. Similarly, brake 162 operates to automatically lock shaft 130 when motor 102 is deenergized. In this way, shoulder 62 is held in place rotationally. It is sometimes desirable, however, to release brakes 160 and 162 in order to manually rotate shoulder 62 and pivot (pitch) the lower robot arm 64 downward (or upward). Brake release 90b is pulled which, via cam 170, pushes a release built into brake 162. Similarly, brake release 90a, via cam 172, pushes a release built into brake 160. Encoders 180a and 180b are used to sense the speed of shafts 110 and 130, respectively, for motor control.

The position of the pitch and rotational motions of the shoulder is determined via potentiometers driven by the output shafts 112 and 132 of the drive motors. Both outputs shafts 112 and 132 have spur gear pinions 181a and 181b respectively connected to them. Spurs gear pinions 181a and 181b drive mating spur gears 182a and 182b which are connected to the shafts of potentiometers 183a and 183b.

Figure 7:
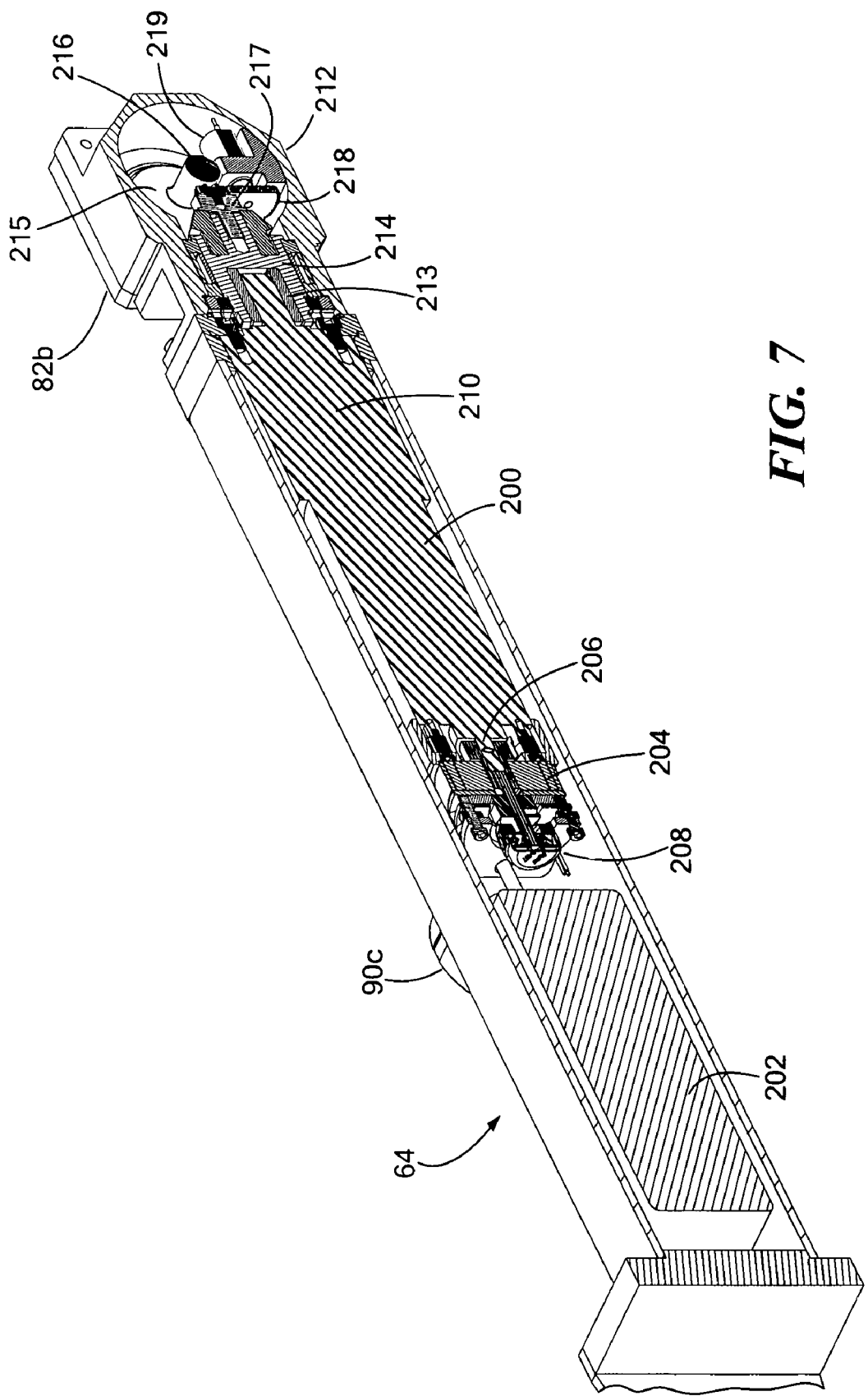
FIG. 7 is a schematic three-dimensional cut-away view showing several of the primary components associated with the lower robot arm of the robot arm assembly shown in FIG. 2.

In one example, lower robot arm 64, FIG. 7 includes motor 200 controlled by motor controller 202 which drives yoke arms 82a, 82b, FIG. 2 to pivot upper arm 66 with respect to lower arm 64. Brake 204, FIG. 7 locks motor shaft 206 in place when motor 200 is deenergized to prevent movement of upper arm 66, FIG. 2 with respect to lower arm 64. Brake release 90c, FIG. 7 releases brake 204. Encoder 208 is used to sense speed of motor shaft 206. Motor 200 turns yoke arms 82a/b via planetary gear reducer 210 and right angle gear box 212. Output shaft 213 of planetary gear reducer 210 drives input pinion 214 of right angle gearbox 212. Input pinion 214 drives output gear 215. This gear pair may have any possible ratio. Output gear 215 drives output shaft 216 which is connected to yoke arms 82a/82b. Output shaft 213 of planetary gear reducer 210 is also attached to spur gear 217 which drives spur gear 218. Spur gear 218 is connected to potentiometer 219. Potentiometer 219 gives absolute position location of output shaft 216.

Figure 8:
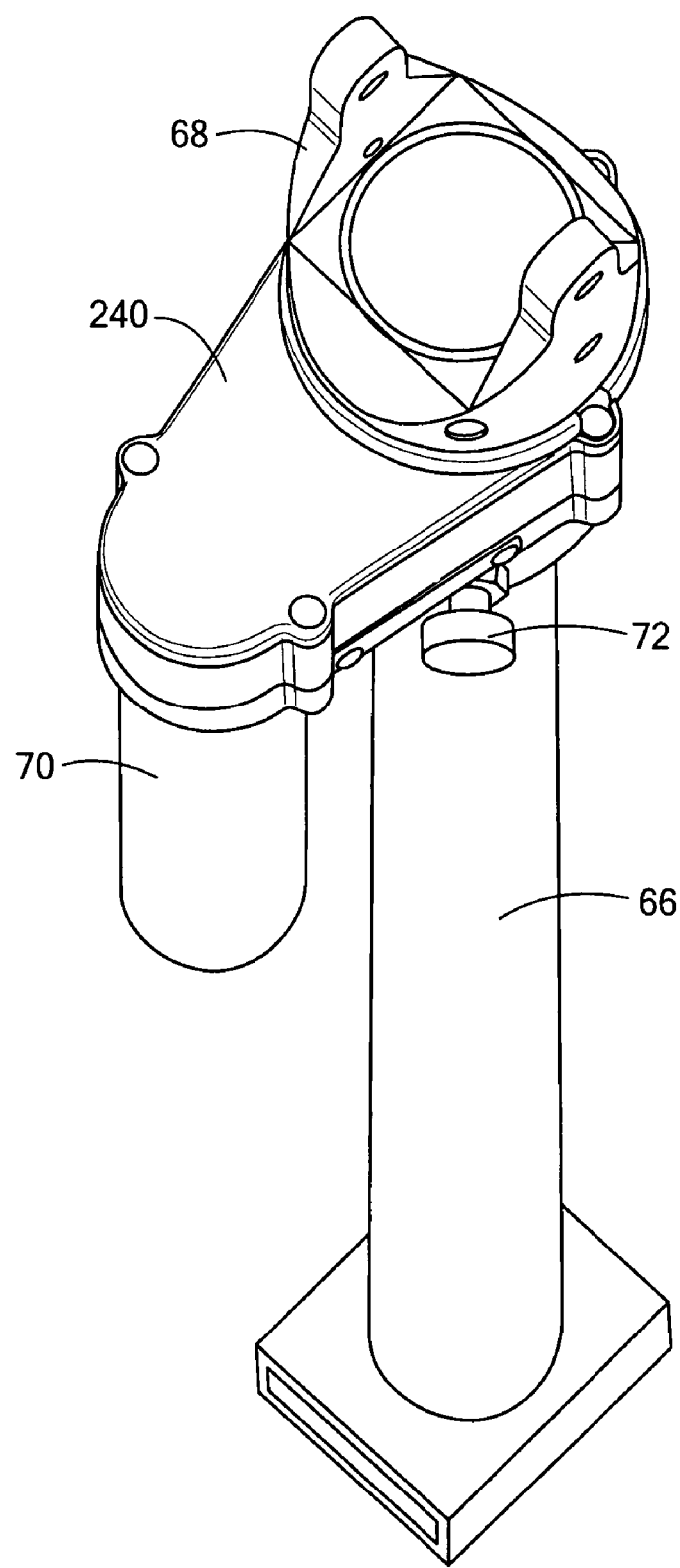
FIG. 8 is a schematic three-dimensional end view showing the rotatable wrist associated with the upper robot arm of the robot arm assembly shown in FIG. 2.
Figure 9:
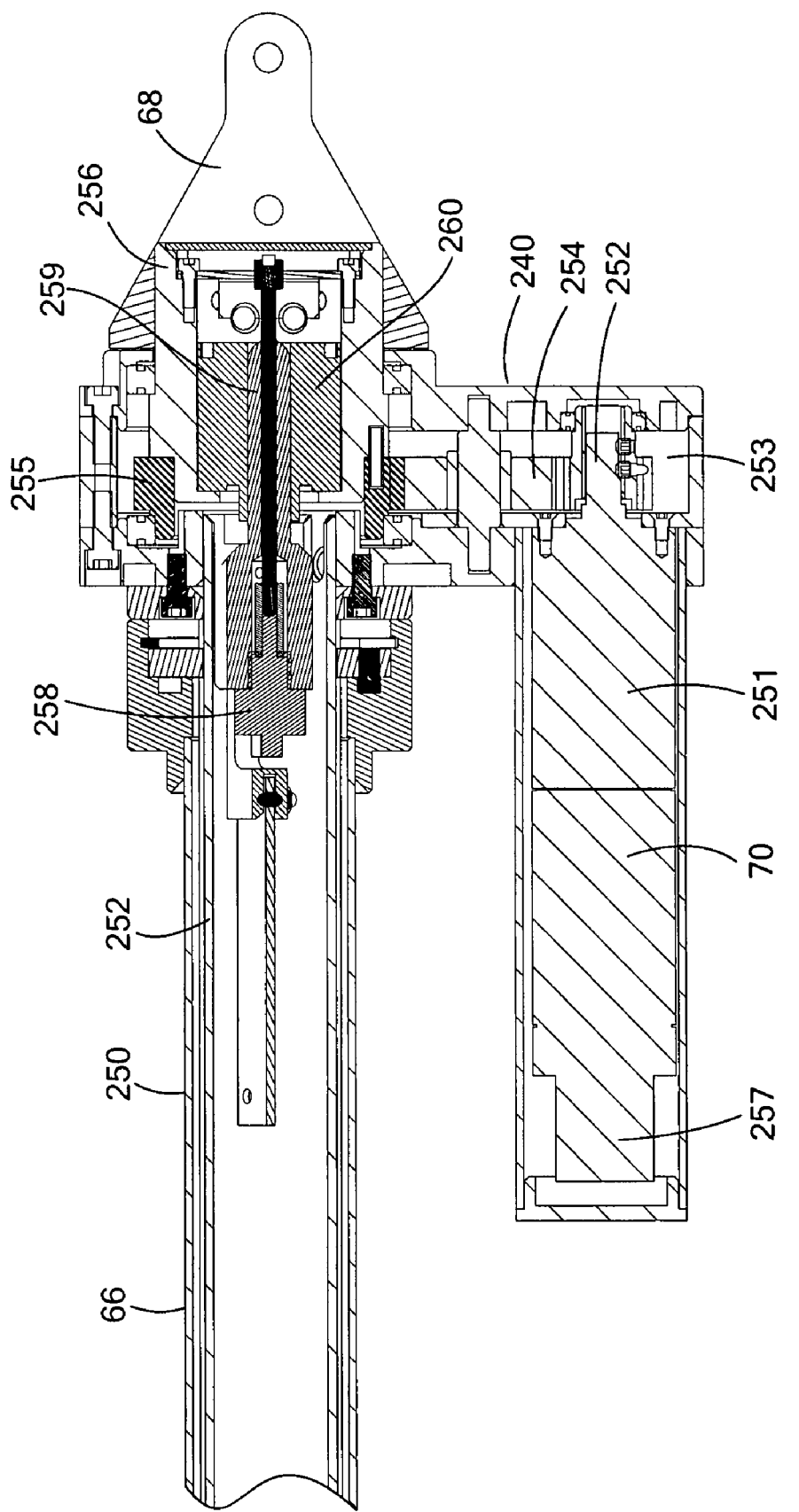
FIG. 9 is a schematic three-dimensional cut-away view showing several of the primary components associated with the rotating wrist shown in FIG. 8.

One example of upper robot arm 66 is shown in FIGS. 8-9. Motor 70, through gear box 240 rotates wrist 68. FIG. 9 shows outer tube 250 and inner tube 252 which telescopes inside outer tube 250. Motor 70 is attached to planetary gear reducer 251 which drives output shaft 252. Output shaft 252 drives input gear 253 which drives output gear 255 through idler gear 254. Output gear 255 is fixed to drive hub 256 which in turn drives wrist output 68. When wrist motor 70 is not powered, wrist movement is held fixed by spring-set electromagnetic brake 257. The absolute position of wrist output 68 is transmitted via shaft 259 to potentiometer 258 which remains fixed in inner tube 252. Electrical power and signals are transmitted through slip ring 260 to wrist mounted devices.

In one example, the robot arm will provide 2700 in-lbs pitch torque and 1800 in-lbs rotational torque at the shoulder joint, 1800 in-lbs of pitch torque at the elbow, and 176 in-lbs of roll torque at the wrist. However, design is scalable based upon motor size, gearbox selection and gear selection.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A robot arm assembly comprising:
a base unit;
a shoulder assembly rotatably disposed on the base unit;
a lower robot arm pivotably attached to the shoulder assembly;
an upper robot arm pivotably attached to the lower robot arm;
a main shaft rotatably disposed in the base unit and connected to the shoulder assembly;
the base unit including a first motor which rotates the main shaft connected to the shoulder assembly to rotate the shoulder assembly;
a second shaft rotatably disposed in the shoulder assembly and extending transversely through and rotatable with respect to the main shaft and connected to the lower robot arm;
the base unit further including a second motor which rotates the second shaft in the shoulder assembly to pivot the lower robot arm with respect to the shoulder assembly.

2. The robot arm assembly of claim 1 in which the lower robot arm includes a third motor for pivoting the upper robot arm.

3. The robot arm assembly of claim 2 further including a brake associated with each motor for locking the shoulder with respect to the base unit, for locking the lower robot arm with respect to the shoulder, and for locking the upper robot arm with respect to the lower robot arm automatically when the motors are de-energized.

4. The robot arm assembly of claim 3 further including a brake release for each brake for manually rotating the shoulder assembly, pivoting the lower robot arm, and pivoting the upper robot arm.

5. The robot arm assembly of claim 1 in which the upper robot arm includes at least one telescoping section.

6. The robot arm assembly of claim 1 in which the lower robot arm is pivotably attached to the shoulder assembly via a yoke.

7. The robot arm assembly of claim 1 in which there is a gear fixed to the main shaft driven by the first motor.

8. The robot arm assembly of claim 7 including a gear reducer between the main shaft and the first motor.

9. The robot arm assembly of claim 1 in which there is a gear on the second shaft in the shoulder driven by a gear train.

10. The robot arm assembly of claim 9 in which there is a gear reducer between the second motor and the gear train.

11. The robot arm assembly of claim 1 in which the upper robot arm includes a rotatable wrist and a motor for driving the rotatable wrist.

12. A robot arm assembly comprising:
a base unit;
a shoulder assembly rotatably disposed on the base unit;
a lower robot arm pivotably attached to the shoulder assembly;
a main vertical shaft rotatably disposed in the base unit and connected to the shoulder assembly;
the base unit including a first motor which rotates the main vertical shaft connected to the shoulder assembly to rotate the shoulder assembly; and
a second horizontal shaft rotatably disposed in the shoulder assembly and extending transversely through and rotatable with respect to the main shaft and connected to the lower robot arm;
the base unit further including a second motor which rotates the second horizontal shaft in the shoulder assembly to pivot the lower robot arm with respect to the shoulder assembly.

13. The robot arm assembly of claim 12 further including an upper robot arm pivotably attached to the lower robot arm.

14. The robot arm assembly of claim 13 in which the lower robot arm includes a third motor for pivoting the upper robot arm.

15. The robot arm assembly of claim 14 further including a brake associated with each motor for locking the shoulder with respect to the base unit, for locking the lower robot arm with respect to the shoulder, and for locking the upper robot arm with respect to the lower robot arm automatically when the motors are de-energized.

16. The robot arm assembly of claim 15 further including a brake release for each brake for manually rotating the shoulder assembly, pivoting the lower robot arm, and pivoting the upper robot arm.

17. The robot arm assembly of claim 13 in which the upper robot arm includes at least one telescoping section.

18. The robot arm assembly of claim 13 in which the upper robot arm includes a rotatable wrist and a motor for driving the rotatable wrist.

19. The robot arm assembly of claim 12 in which the lower robot arm is pivotably attached to the shoulder assembly via a yoke.

20. The robot arm assembly of claim 12 in which there is a gear fixed to the main shaft driven by the first motor.

21. The robot arm assembly of claim 20 including a gear reducer between the main shaft and the first motor.

22. The robot arm assembly of claim 12 in which there is a gear on the second shaft driven by a gear train.

23. The robot arm assembly of claim 22 in which there is a gear reducer between the second motor and the gear train.

24. A robot arm assembly comprising:
   a base unit;
   a shoulder assembly rotatably disposed on the base unit;
   a lower robot arm pivotably attached to the shoulder assembly;
   an upper robot arm pivotably attached to the lower robot arm and driven by a motor in the lower robot arm, the upper robot arm including a telescoping section and a motor driven rotatable wrist;
   a main shaft rotatably disposed in the base unit and connected to the shoulder assembly;
   a second shaft rotatably disposed in the shoulder assembly and extending transversely through and rotatable with respect to the main shaft and connected to the lower robot arm;
   the base unit including:
      a first motor which rotates the main shaft connected to the shoulder assembly to rotate the shoulder,
      a second motor which rotates the second shaft in the shoulder assembly to pivot the lower robot arm with respect to the shoulder assembly,
      a gear fixed to the main shaft driven by the first motor through a gear reducer,
      a brake with a release associated with the first motor, and
      a brake with a release associated with the second motor; and
   the shoulder assembly including a gear fixed to the second shaft driven by the second motor through a gear train and a gear reducer.

* * * * *